US009176672B2

(12) United States Patent
Zhao et al.

(10) Patent No.: US 9,176,672 B2
(45) Date of Patent: Nov. 3, 2015

(54) INPUT/OUTPUT (I/O) COMMAND AGGREGATION (71) Applicant: Marvell International Ltd., Hamilton (BM)

(72) Inventors: Qun Zhao, Pleasanton, CA (US); Xinhai Kang, Milpitas, CA (US); Michael Wang, Shanghai (CN); Jacky Feng, Shanghai (CN); Nancy Xu, Shanghai (CN); Andy Yan, Shanghai (CN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/659,279

(22) Filed: Mar. 16, 2015

(65) Prior Publication Data
US 2015/0253995 A1  Sep. 10, 2015

Related U.S. Application Data (63) Continuation of application No. 13/851,908, filed on Mar. 27, 2013, now Pat. No. 8,984,182, which is a continuation-in-part of application No. 13/645,370, filed on Oct. 4, 2012, now Pat. No. 8,918,554.

(60) Provisional application No. 61/618,238, filed on Mar. 30, 2012, provisional application No. 61/543,929, filed on Oct. 6, 2011.

(51) Int. Cl.
G06F 3/06 (2006.01)
G06F 13/10 (2006.01)
G06F 13/42 (2006.01)

(52) U.S. Cl.
CPC ............... *G06F 3/061* (2013.01); *G06F 3/067* (2013.01); *G06F 3/0659* (2013.01); *G06F 13/102* (2013.01); *G06F 13/42* (2013.01)

(58) Field of Classification Search
CPC ...... G06F 3/061; G06F 3/0659; G06F 3/0679
See application file for complete search history.

(56) References Cited

U.S. PATENT DOCUMENTS

| 4,423,480 | A | 12/1983 | Bauer |
| 2005/0256983 | A1 | 11/2005 | Ma |

(Continued)

OTHER PUBLICATIONS

Huffman et al., Serial ATA Native Command Queuing, An Exciting New Performance Feature for Serial ATA, Jul. 2003, 12 pages.

(Continued)

*Primary Examiner* — Idriss N Alrobaye
*Assistant Examiner* — Ronald Modo (57) ABSTRACT

Systems and techniques relating to input/output (I/O) command aggregation include, according to at least one implementation, a method including receiving a first command from a device driver through interface hardware for accessing a storage device; identifying the received command as an aggregation command having a tag corresponding to consolidated command information; communicating a transfer ready notification to the device driver; receiving the consolidated command information from the device driver, wherein the consolidated command information includes memory addresses and data transfer counts for a defined quantity of aggregated I/O commands or for aggregated I/O commands that are received within a defined period of time; storing the consolidated command information in memory; receiving a second command including the tag corresponding to the consolidated command information; and processing the second command with respect to the storage device based on the memory addresses and the data transfer counts in the consolidated command information.

19 Claims, 10 Drawing Sheets

(56) References Cited

U.S. PATENT DOCUMENTS

2008/0270678 A1  10/2008  Cornwell
2009/0125681 A1* 5/2009  Makita .................. 711/114
2009/0172264 A1  7/2009  Chung
2010/0161936 A1  6/2010  Royer

OTHER PUBLICATIONS

Van Rijssel, Debbie, Authorized Officer, European Patent Office, International Search Report and Written Opinion, PCT/IB2012/055386, Mar. 11, 2013, 13 pages.

* cited by examiner

| | 7 | 6 | 5 | 4 | 3 | 2 | 1 | 0 |
|---|---|---|---|---|---|---|---|---|
| 0 | OPERATION CODE ||||||||
| 1 | RESERVED ||||||||
| 2 | PACKET ||||||||
| 3 | TAG ||||||||
| 4 | ||||||||
| 5 | PACKET SIZE ||||||||
| 6 | IN NUMBER OF BYTES ||||||||
| 7 | ||||||||
| 8 | RESERVED ||||||||
| 9 | CONTROL ||||||||

| | 7 | 6 | 5 | 4 | 3 | 2 | 1 | 0 |
|---|---|---|---|---|---|---|---|---|
| | PACKET HEADER ||||||||
| | SUB-COMMANDS ||||||||

| | 7 | 6 | 5 | 4 | 3 | 2 | 1 | 0 |
|---|---|---|---|---|---|---|---|---|
| 0 | \multicolumn{8}{c|}{PACKET SIZE IN NUMBER OF BYTES} |
| 1 | | | | | | | | |
| 2 | | | | | | | | |
| 3 | | | | | | | | |
| 4 | \multicolumn{8}{c|}{TOTAL NUMBER OF SUB-COMMANDS} |
| 5 | | | | | | | | |
| 6 | \multicolumn{8}{c|}{PACKET TAG} |
| 7 | | | | | | | | |
| 8 | \multicolumn{8}{c|}{TOTAL TRANSFER LENGTH IN NUMBER OF BLOCKS} |
| 9 | | | | | | | | |
| 10 | | | | | | | | |
| 11 | | | | | | | | |
| 12 | \multicolumn{8}{c|}{RESERVED} |
| 13 | | | | | | | | |
| 14 | | | | | | | | |
| 15 | | | | | | | | |

| | 7 | 6 | 5 | 4 | 3 | 2 | 1 | 0 |
|---|---|---|---|---|---|---|---|---|
| 0 | RESERVED ||||||| L (0) |
| 1 | RESERVED ||||||||
| 2 | TRANSFER LENGTH ||||||||
| 3 | IN NUMBER OF BLOCKS ||||||||
| 4 | LOGICAL<br>BLOCK ADDRESS ||||||||
| 5 | |||||||||
| 6 | |||||||||
| 7 | |||||||||

| | 7 | 6 | 5 | 4 | 3 | 2 | 1 | 0 |
|---|---|---|---|---|---|---|---|---|
| 0 | RESVERED ||||||| L (1) |
| 1 | RESERVED ||||||||
| 2 | |||||||||
| 3 | |||||||||
| 4 | TRANSFER LENGTH<br>IN NUMBER OF BLOCKS ||||||||
| 5 | |||||||||
| 6 | |||||||||
| 7 | |||||||||
| 8 | LOGICAL<br>BLOCK<br>ADDRESS ||||||||
| 9 | |||||||||
| 10 | |||||||||
| 11 | |||||||||
| 12 | |||||||||
| 13 | |||||||||
| 14 | |||||||||
| 15 | |||||||||

| | 7 | 6 | 5 | 4 | 3 | 2 | 1 | 0 |
|---|---|---|---|---|---|---|---|---|
| 0 | \multicolumn{8}{c|}{OPERATION CODE} |
| 1 | RESERVED ||||||||
| 2 | PACKET ||||||||
| 3 | TAG ||||||||
| 4 | ||||||||
| 5 | TRANSFER LENGTH ||||||||
| 6 | IN NUMBER OF BLOCKS ||||||||
| 7 | ||||||||
| 8 | RESERVED ||||||||
| 9 | CONTROL ||||||||

FIG. 12 under the US 9,176,672 B2

INPUT/OUTPUT (I/O) COMMAND AGGREGATION

CROSS REFERENCE TO RELATED APPLICATIONS

This disclosure is a continuation of and claims the benefit of the priority of U.S. patent application Ser. No. 13/851,908, filed Mar. 27, 2013, entitled "SCSI I/O COMMAND AGGREGATION", which claims the benefits of the priority of U.S. Provisional Application Ser. No. 61/618,238, filed Mar. 30, 2012, and entitled "I/O Aggregation for the SCSI of an SSD Device," which is hereby incorporated by reference in its entirety. U.S. patent application Ser. No. 13/851,908, filed Mar. 27, 2013, is also a continuation-in-part of and claims the benefit of the priority of U.S. patent application Ser. No. 13/645,370, filed Oct. 4, 2012, and entitled "Method and Apparatus for Effectively Increasing a Command Queue Length for Accessing Storage," which claims the benefit of priority of U.S. Provisional Application Ser. No. 61/543,929, filed Oct. 6, 2011, and entitled "Use Information Command to Increase the Q-Depth of SATA NCQ Command Unlimitedly," the contents of each of which is hereby incorporated by reference in their entirety.

BACKGROUND

The present disclosure describes systems and techniques relating to input/output (I/O) command aggregation for Small Computer System Interface (SCSI) enabled devices.

A solid state disk (SSD) comprises an array of solid state electronic memory chips. A SSD generally includes two parts. A control unit and a storage unit (e.g., Dynamic Random-Access Memory (DRAM), FLASH memory, etc.). The storage unit is responsible for storing data, and the control unit is responsible for reading and writing data. SSD technology is high speed, durable and shockproof, noiseless, and lightweight. As a result, SSD drives are suited to widespread applications in fields such as the military, vehicle-based devices, industrial control, video monitoring, network monitoring, network terminals, electrical power, medical care, aviation, and navigational devices.

Small computer system interface (SCSI) is a system-level interface standard for physically connecting and transferring data between computers and peripheral devices (e.g., hard disk drives, solid state disk drives, floppy disk drives, optical disk drives, printers, scanners, etc.). The SCSI standard defines commands, protocols, and electrical and optical interfaces. Some characteristics associated with the SCSI standard include multi-tasking, large bandwidth, low CPU usage, and hot swapping. SCSI host adapters and peripheral devices (e.g., SSD devices) can employ an Advanced SCSI Programming Interface (ASPI) for communication between the host adapters and peripheral devices. ASPI is an application programming interface which standardizes communication on a computer bus between a SCSI host adapter and SCSI peripherals.

Serial Attached SCSI interface (SAS) is a newer generation SCSI technology. SAS is a point-to-point serial protocol that is used to move data to and from computer storage devices such as hard drives, SSD drives, tape drives, optical drives, and the like. SAS uses the standard SCSI command set.

SUMMARY

The present disclosure describes systems and techniques relating to input/output (I/O) command aggregation for Small Computer System Interface (SCSI) enabled devices.

In an implementation, a method includes receiving a first command for a target device, where the first command includes a first memory address and a first data transfer count, receiving a second command for the target device, where the second command includes a second memory address and a second data transfer count, and where the first and second commands are entirely read commands or entirely write commands, aggregating the first and second memory addresses and the first and second data transfer counts into consolidated command information, generating a packet command that includes a packet tag and a data size corresponding to the consolidated command information, communicating the packet command to the target device, in response to receiving a transfer ready notification from the target device, communicating the consolidated command information to the target device, and communicating additional information to the target device.

These and other implementations can optionally include one or more of the following features. When the first and second commands are entirely read commands, communicating the additional information can comprise generating a packet read command that includes the packet tag, communicating the packet read command to the target device, and receiving data corresponding to the consolidated command information from the target device. When the first and second commands are entirely write commands, communicating the additional information can comprise generating a packet write command that includes the packet tag, communicating the packet write command to the target device, and in response to receiving a transfer ready notification from the target device, communicating data corresponding to the consolidated command information to the target device. A consolidated command table can be generated including the first and second memory addresses and the first and second data transfer counts, and wherein the data size corresponding to the consolidated command information is a data size of the consolidated command table. The consolidated command table can include a list of sub-commands having a specified command format. Communicating the consolidated command information to the target device can comprise communicating the consolidated command table to the target device. The packet command can include an operation code designating the packet command as an aggregation command. The first and second commands can be received within a defined period of time. The consolidated command information can include memory addresses and data transfer counts for a defined quantity of commands.

In an implementation, a device includes a controller configured to communicate with a device driver through interface hardware using the small computer system interface (SCSI) standard where the controller is further configured to receive and process commands for accessing storage, including performing operations comprising: receiving a first command including a packet tag and a data size corresponding to consolidated command information, identifying the first command as a packet command associated with the consolidated command information, communicating a transfer ready notification to the device driver, receiving the consolidated command information from the device driver, storing the consolidated command information in memory, and receiving a second command including the packet tag.

These and other implementations can optionally include one or more of the following features. When the second command is a packet read command, communicating data stored in memory corresponding to the consolidated command information to the device driver. When the second command is a packet write command, communicating a transfer ready notification to the device driver, receiving data from the device driver, and storing the received data in memory in accordance with the consolidated command information. The consolidated command information can be a command table including memory addresses and data transfer counts corresponding to a plurality of commands for accessing storage. The packet command can include an operation code designating the packet command as an aggregation command. The consolidated command information can include memory addresses and data transfer counts for a defined quantity of commands.

In an implementation, a system includes: a host computer; a storage device including: interface hardware configured to communicate with the host computer, a controller configured to communicate with the host computer through the interface hardware using a small computer system interface (SCSI) standard, and memory to store data persistently; a host bus adapter communicatively coupled to the host computer, the host bus adapter including a storage device driver configured to: receive commands to access the memory of the storage device, aggregate the received commands into consolidated command information including a memory address and a data transfer count from each of the received commands, generate a packet command including a packet tag and a data size corresponding to the consolidated command information, communicate the packet command to the storage device, and in response to receipt of a transfer ready notification from the storage device, communicate the consolidated command information to the storage device; and wherein the controller included in the storage device is configured to receive and process the consolidated command information communicated by the storage device driver, including performing operations comprising: processing at least one of a packet read command and a packet write command including the packet tag based on the memory addresses and the data transfer counts in the consolidated command information.

These and other implementations can optionally include one or more of the following features. Processing a packet read command can include communicating data stored in the memory corresponding to the consolidated command information to the storage device driver. Processing a packet write command can include communicating a transfer ready notification to the storage device driver, receiving data from the storage device driver, and storing the received data in the memory in accordance with the consolidated command information. The packet command can include an operation code designating the packet command as an aggregation command. The storage device driver can be configured to aggregate the received commands based on at least one of the time when the commands are received and a defined quantity of commands.

As the processing speed of SSD devices increase, so does the demand for small block data access through SCSI and higher I/O per second (IOPS) rates for processors. A processor in a host system usually must process every I/O request individually. Processing I/O requests one at a time may lead to a lower IOPS rate and put more pressure on the processor. Consequently, within the context of small block data access through SCSI, processors may pose a bottleneck to achieving higher IOPS rates.

The described systems and techniques may result in an increased effective IOPS rate for SCSI peripherals while reducing pressure on processors. For example, by consolidating I/O commands that would normally be processed individually by a host processor, the host processor can effectively process more I/O commands, thus resulting in an increased IOPS rate for the host processor and system. To achieve an increased IOPS rate, a host system can aggregate multiple I/O commands into a single I/O command and send the single I/O command to a storage device for processing. Such consolidation reduces the number of I/O commands individually processed by the host system while increasing the potential IOPS rate from the host system's point of view.

The I/O aggregation described herein can achieve improved IOPS rates for host systems based on software solutions without the need for hardware modifications. Such software solutions may allow for easier implementation and adoption of I/O aggregation.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform method operations. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus and system implementations can be realized from a disclosed method, computer-readable medium, or apparatus.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Flash Memory Overview

Figure 1:
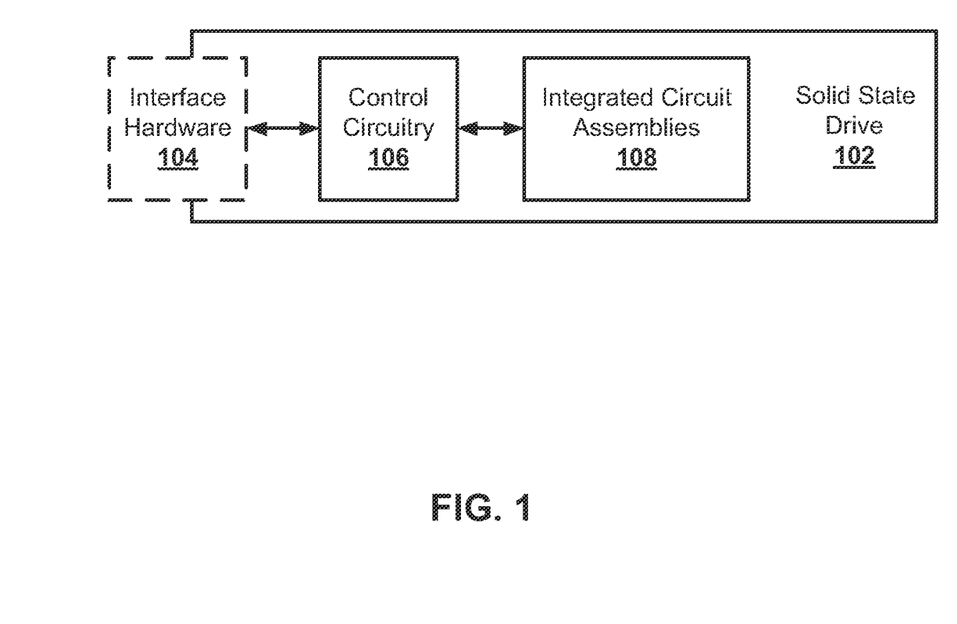
FIG. 1 shows an example of a solid state drive.

FIG. 1 shows an example of a Solid State Drive (SSD) 102. SSD 102 includes integrated circuit assemblies 108 forming memory to store data persistently. In some implementations, integrated circuit assemblies 108 may be "NAND" type flash memory. NAND flash memory generally has faster erase and program times, higher density, lower cost per bit, and more endurance than, for example, NOR-type flash memory. NAND flash memory may utilize series strings of more than two memory cells, such as 16 or 32, connected along with one or more select transistors between individual bit lines and a reference potential to form columns of cells. Word lines may extend across cells within such columns. An individual cell within a column may be read and verified during programming by causing remaining cells in the string to be turned on so that the current flowing through a string may be dependent upon the level of charge stored in the addressed cell.

SSD 102 includes control circuitry 106 for communicating with integrated circuit assemblies 108. In some implementations, control circuitry 106 includes an embedded processor that executes firmware-level code to bridge the integrated circuit assemblies 108 with a host system (not shown). For example, control circuitry 106 may include a NAND flash I/O (Input/Output) controller for communicating with a NAND memory, and may allow only sequential access to data stored in the NAND flash memory.

SSD 102 includes interface hardware 104 for connecting SSD 102 to a host bus adapter of a host (not shown). In some implementations, interface hardware 104 includes one or more standard connectors. Examples of standard connectors may include, without limitation, Small Computer System Interface (SCSI), Serial Attached SCSI (SAS), Universal Flash Storage (UFS), Serial Advanced Technology Attachment (SATA), USB (Universal Serial Bus), PCMCIA (Personal Computer Memory Card International Association), IEEE-1394 (Firewire), Peripheral Component (PCI), PCI Express (PCIe), and interfaces for memory cards such as Multi Media Cards (MMCs). In some implementations, interface hardware 104 may include multiple pins each corresponding to a specific function. For example, pins for power, ground, send, receive, transfer complete, communication, and the like.

While NAND flash memory has been described in the examples for Solid State Drive 102, it should be noted that other memory types also may be used, such as, without limitation, NOR flash EEPROM, AND flash EEPROM, DiNOR flash EEPROM, serial flash EEPROM, DRAM, SRAM, ROM, EPROM, FRAM, MRAM, and PCRAM.

Storage System

Figure 2:
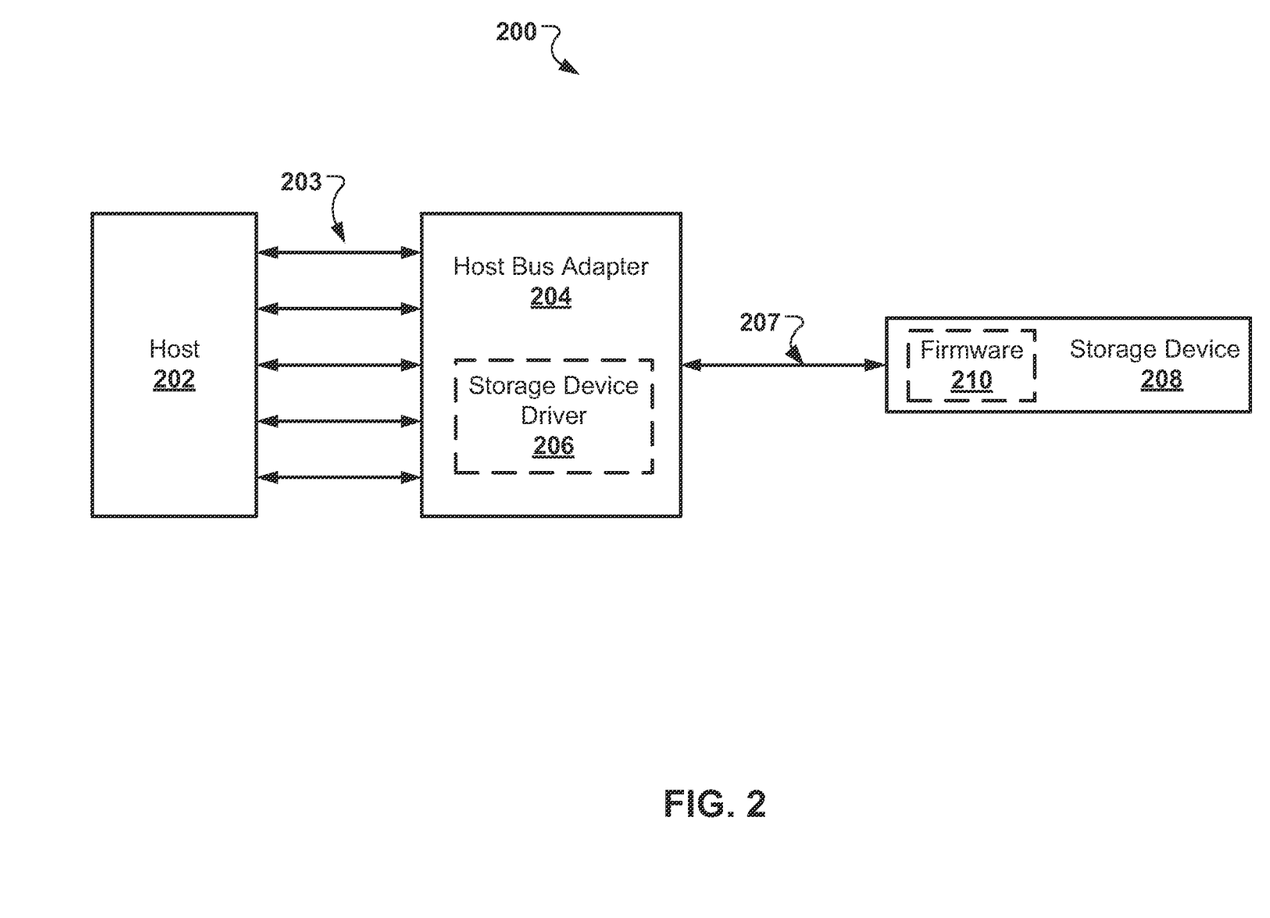
FIG. 2 shows an example of a storage system.

FIG. 2 shows an example of a storage system 200. As shown in FIG. 2, the system 200 includes a host 202 in communication with a storage device 208 using a host bus adapter 204. In some implementations, multiple application processes execute on host 202 and request access to data stored on storage device 208. Various examples of host bus adapter 204 include physical interfaces such as Small Computer System Interface (SCSI), Serial Attached SCSI (SAS), Universal Flash Storage (UFS), Serial Advanced Technology Attachment (SATA), USB (Universal Serial Bus), PCMCIA (Personal Computer Memory Card International Association), IEEE-1394 (Firewire), Peripheral Component (PCI), PCI Express (PCIe), and interfaces for memory cards such as Multi Media Cards (MMCs).

Various examples of storage device 208 include a solid state drive (e.g., solid state drive 102 in FIG. 1), a hard disk drive (HDD), an optical disk drive, and the like. In some implementations, storage device 208 includes firmware 210. Firmware 210 can be code executing on a controller included in storage device 208 operable to bridge the memory components of storage device 208 with an interface of host bus adapter 204.

In some implementations, host bus adapter 204 includes storage device driver 206 for receiving and processing one or more service requests or commands (e.g., input and output (I/O) commands, also known as read and write commands) 203 directed to storage device 208. For example, storage device driver 206 may be configured to manage and control storage and retrieval of data stored in memory of storage device 208 in response to I/O commands 203 from host 202. That is, storage device driver 206 may control the flow of I/O commands 203 between host 202 and storage device 208. Storage device driver 206 can aggregate I/O commands 203 into an aggregated I/O command 207, as will be described in more detail below.

In some implementations, storage device driver 206 is a part of a microcomputer system under the control of a microprocessor (not shown). For example, storage device driver 206 can include read-only memory (ROM), random-access memory (RAM) and other internal circuits.

Command Flow

Figure 3:
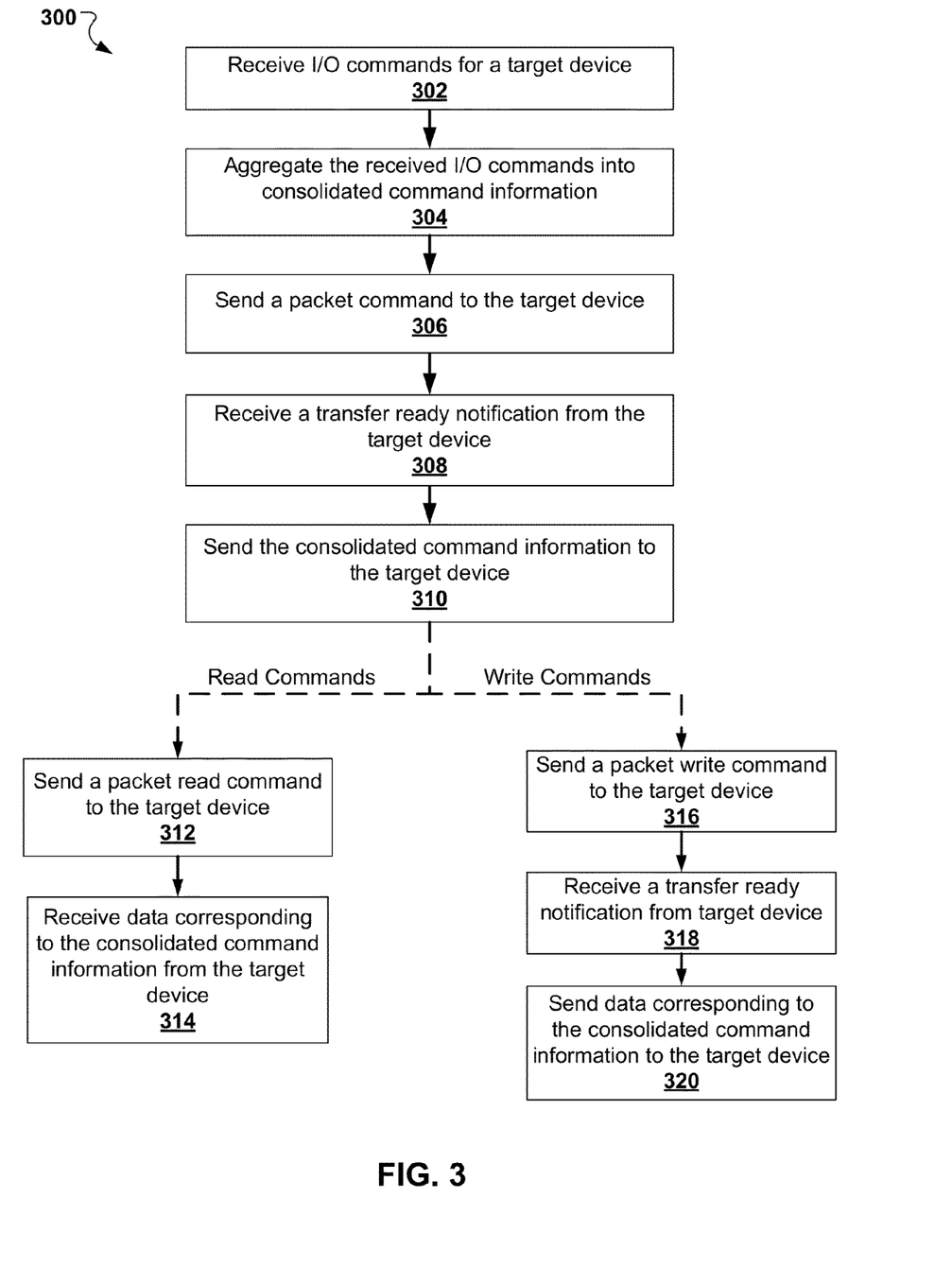
FIG. 3 shows an example of a process for I/O command aggregation.

FIG. 3 shows an example of a process 300 for I/O command aggregation. In some implementations, process 300 is performed by a device driver (e.g., storage device driver 206, an initiator, a launcher, etc.) in communication with host processes executing on a host system (e.g., host 202) and a peripheral device (e.g., storage device 208). In some implementations, the communication of information between a device driver, storage device, and host system may require the use of a corresponding intermediate device. For example, a storage device can be connected to a motherboard, requiring the device driver to communicate with the storage device through the motherboard.

At 302, a device driver receives input/output (I/O) commands from a host system intended for a target device. For example, the device driver can receive commands 203 from application processes executing on host 202 requesting to read data from or write data to storage device 208. In some implementations, the device driver can receive I/O commands for multiple devices and perform process 300 with the I/O commands corresponding to each individual device.

At 304, the device driver aggregates the I/O commands received at 302. As part of this aggregation, the device driver aggregates data from the received I/O commands into consolidated command information. In some implementations, the consolidated command information includes a memory address (e.g., logical block address) and a data transfer count from each of the commands being aggregated. Generally, read and write commands are aggregated separately, such that the corresponding consolidated command information only includes data from read commands or data from write commands, but not both. In some implementations, when the device driver receives I/O commands for multiple target devices, the device driver aggregates data from the I/O commands into consolidated read or write command information for each respective device.

In some implementations, the consolidated command information can be defined in a consolidated command table. A consolidated command table may include, for example, memory addresses and data transfer counts corresponding to each command being aggregated, as described below in Table 1:

TABLE 1

| Aggregated Commands | Memory Address | Data Count |
|---|---|---|
| Command 1 | LBA [xx-xx] | n Bytes |
| Command 2 | LBA [xx-xx] | n Bytes |
| Command 3 | LBA [xx-xx] | n Bytes |
| Command N | LBA [xx-xx] | n Bytes |

In some implementations, when aggregating received I/O commands, the device driver may aggregate I/O commands that are received within a defined period of time or aggregate I/O commands up to specified quantity. The length of the time period or the quantity of aggregated commands may depend on the processing capabilities of the device driver and/or the I/O processing strength of the target device, for example.

At 306, the device driver sends a packet command to the target device. The packet command conforms to the SCSI protocol and includes data necessary for I/O command aggregation. For example, a packet command can include an operation code (op code) designating the command as a packet command for I/O aggregation, a packet tag identifying the specific packet command, and a data size value corresponding to consolidated command information (i.e., consolidated command information aggregated at 304).

In some implementations, a packet command is similar in form to a standard SCSI write command (data out command) and is communicated in a similar way as a standard SCSI write command. However, unlike a standard SCSI write command, a packet command is used to send consolidated command information to a target device.

In some implementations, prior to sending the packet command to the target device, the host driver can confirm whether the target device is configured to receive the commands necessary for I/O command aggregation (e.g., packet command, packet read command, and packet write command).

At 308, the device driver receives a transfer ready notification from the target device. For example, in response to receipt of the packet command sent from the device driver at 306, the target device can reply with a transfer ready notification informing the device driver that the target device is ready to receive the data corresponding to the packet command.

At 310, the device driver sends the consolidated command information aggregated at 304 to the target device. In some implementations, the consolidated command information is defined in a consolidated command table. The consolidated command table can include, for example, memory addresses and data transfer counts corresponding to received I/O commands.

At 312, in the case where the I/O commands aggregated into the consolidated command information at 304 are read commands, the device driver sends a packet read command to the target device. The packet read command effectively instructs the target device to process the consolidated command information previously received by the target device as read commands. In some implementations, the packet read command includes an op code designating the command as a packet read command and the packet tag used to identify the packet command at 306. Including the same tag from the packet command allows the target device, upon receipt of the packet read command, to associate the packet read command with consolidated command information and process the consolidated command information accordingly. That is, use of the same packet tag in both the packet command and packet read command can trigger execution of the consolidated commands upon receipt of the packet read command by the target device.

At 314, the device driver receives data corresponding to the consolidated command information from the target device. For example, upon receipt of a packet read command, including the packet tag from a previous packet command, the target device can retrieve data corresponding to consolidated command information from memory and send this data to the device driver. In effect, receipt of a packet read command including the packet tag triggers execution of corresponding consolidated commands.

At 316, in the case where the I/O commands aggregated into the consolidation command information at 304 are write commands, the device driver sends a packet write command to the target device. The packet write command effectively instructs the target device to process the consolidated command information previously received by the target device as write commands. In some implementations, the packet write command includes an op code designating the command as a packet write command and the packet tag used to identify the packet command at 306. Including the same tag from the packet command allows the target device, upon receipt of the packet write command, to associate the packet write command with consolidated command information and process the consolidated command information accordingly. That is, use of the same packet tag in both the packet command and packet write command can trigger execution of the consolidated commands upon receipt of the packet write command by the target device.

At 318, the device driver receives a transfer ready notification from the target device. For example, in response to receipt of the packet write command from the device driver, the target device can communicate a transfer ready notification to the device driver indicating that the target device is ready to receive data corresponding to the packet write command.

At 320, the device driver sends data corresponding to the consolidated command information to the target device. For example, upon receipt of the transfer ready notification from the target device, the device driver can send data to be written to memory of the target device in accordance with the consolidated command information.

Command Sequences

Figure 4:
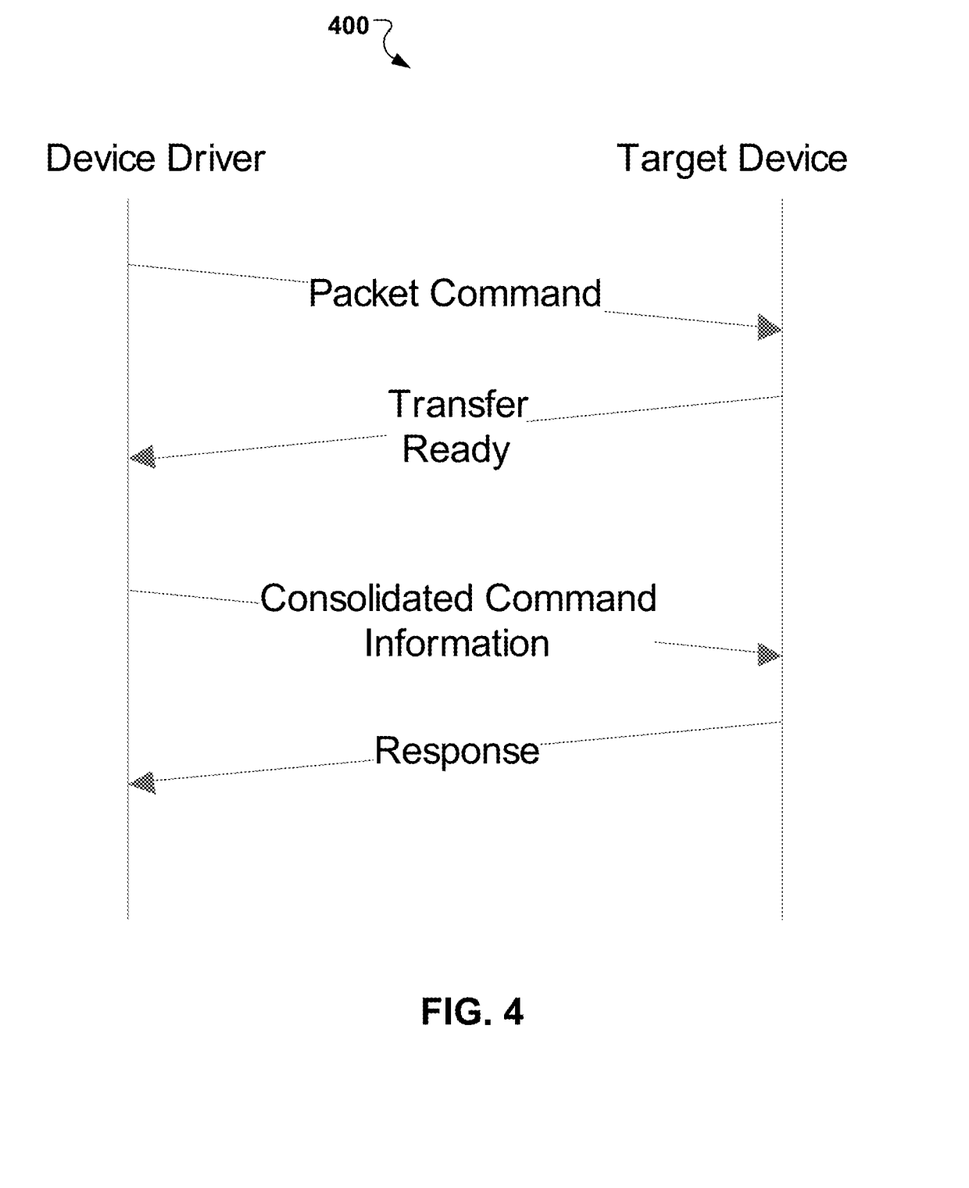
FIG. 4 shows an example of a packet command sequence for I/O command aggregation.

FIG. 4 shows an example of a packet command sequence 400 for I/O command aggregation. As shown in FIG. 4, the device driver sends a packet command, including a packet tag, to the target device. After receiving the packet command, the target device notifies the device driver that the target device is ready for data transfer. Upon learning that the target device is ready for the data transfer, the device driver sends corresponding consolidated command information to the target device. A format of the consolidated command information includes a packet header and sub-commands. The sub-commands include either data from read commands or data from write commands, but not both. In some implementations, after receiving the consolidated command information, the target device can send a response to the device driver. The response can include, for example, a confirmation that the consolidated command information has been received and/or the status of the target device or the consolidated command information.

Figure 5:
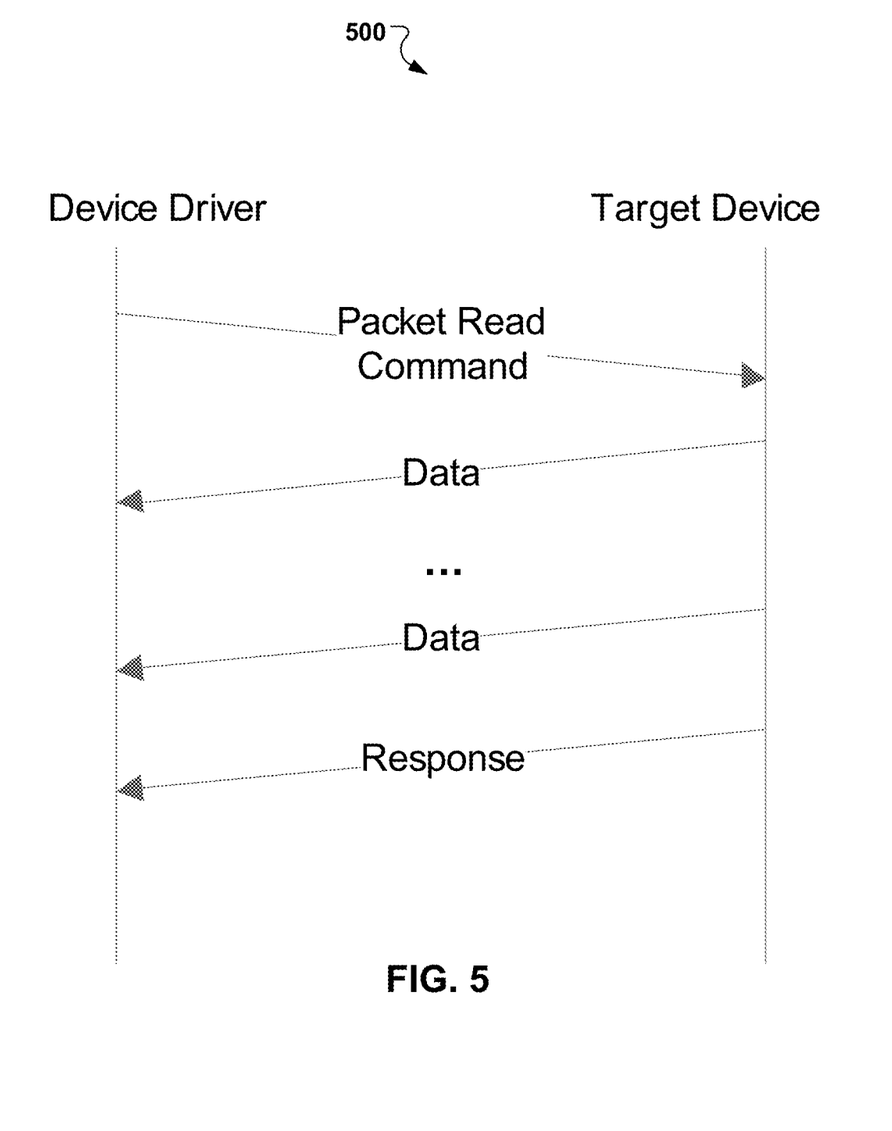
FIG. 5 shows an example of a packet read command sequence for I/O command aggregation.

FIG. 5 is an example of a packet read command sequence 500 for I/O command aggregation. As shown in FIG. 5, the device driver sends a packet read command, including the packet tag previously included in the packet command, to the target device. After receiving the packet read command and associating previously received consolidated command information with the packet tag, the target device retrieves data in accordance with the consolidated command information and sends this data to the device driver. In some implementations, after sending data corresponding to the consolidated command information, the target device can send a response to the device driver. The response can include, for example, a confirmation that the packet read command is complete and/or a status of the target device.

Figure 6:
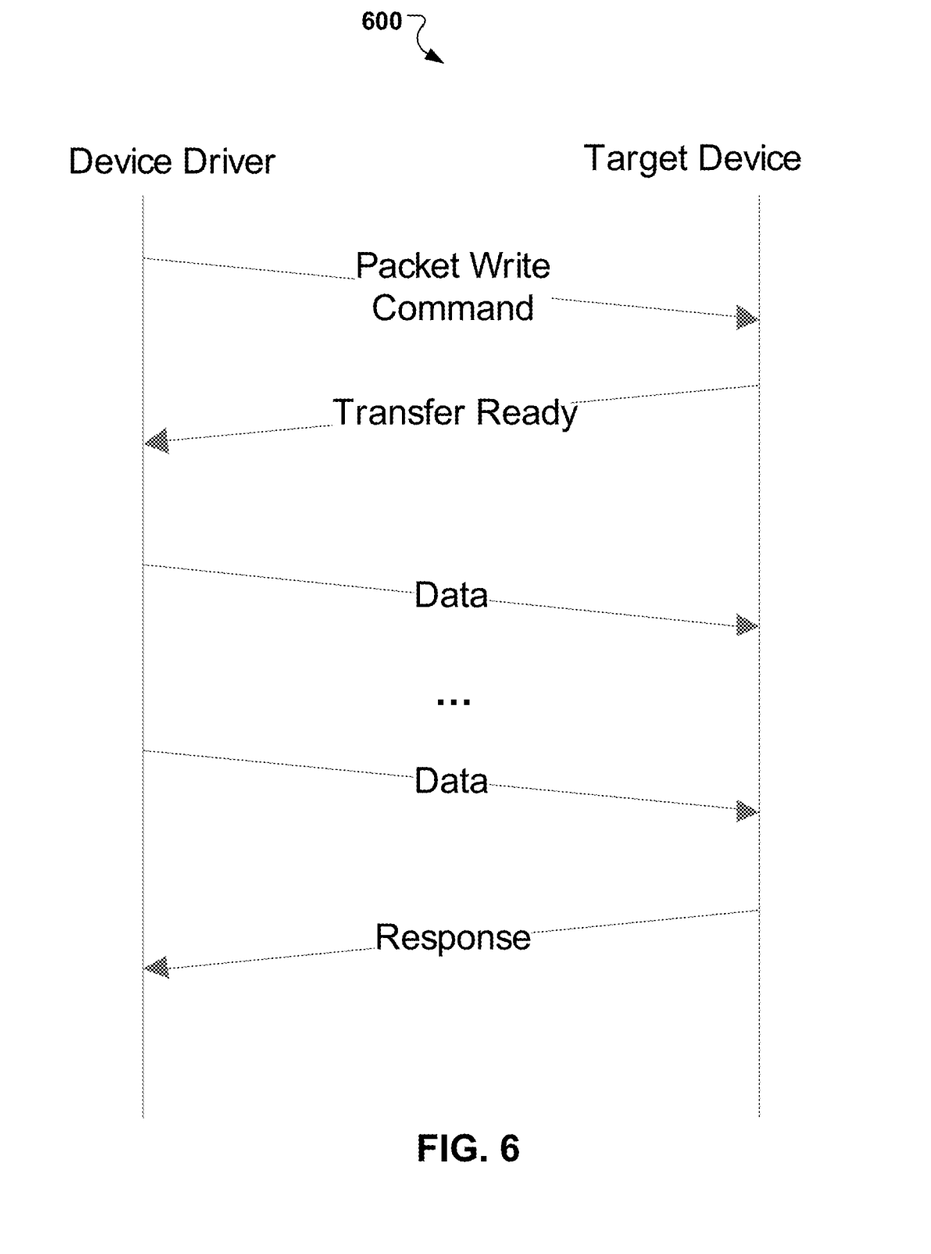
FIG. 6 shows an example of a packet write command sequence for I/O command aggregation.

FIG. 6 is an example of a packet write command sequence 600 for I/O command aggregation. As shown in FIG. 6, the device driver sends a packet write command, including the packet tag previously included in the packet command, to the target device. After receiving the packet write command and associating previously received consolidated command information with the packet tag, the target device informs the device driver that the target device is ready for the transfer of data corresponding to the consolidated command information. After confirming that the target device is ready to receive data, the device driver sends data corresponding to the consolidated command information to the target device. In some implementations, after receiving the data, the target device can send a response to the device driver. The response can include, for example, a confirmation that the packet write command is complete and/or a status of the target device.

Packet Formats and Command Descriptor Block Formats

Figure 7:
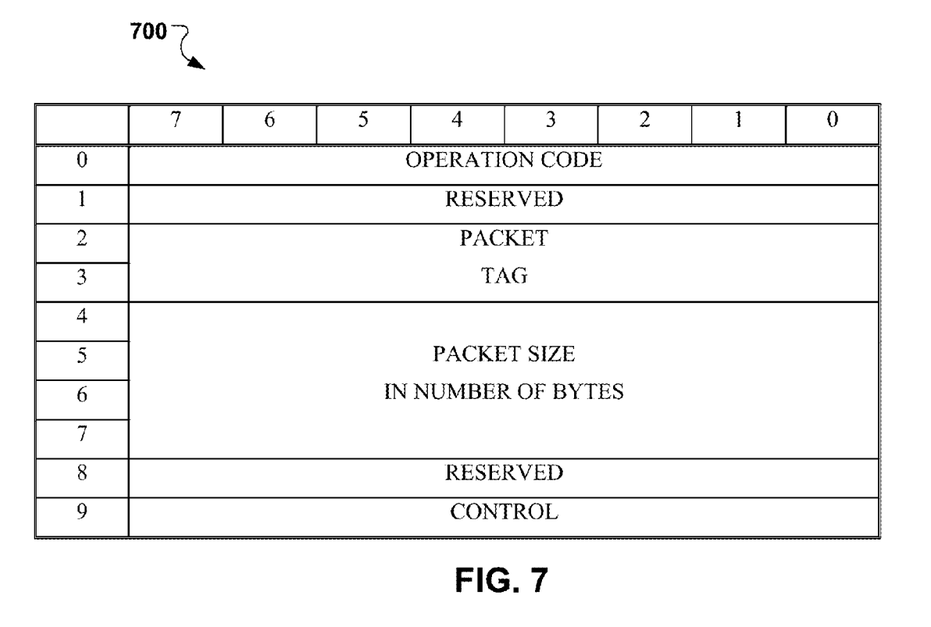
FIG. 7 shows an example of a command descriptor block for a packet command.

FIG. 7 shows an example of a command descriptor block (CDB) 700 for a packet command. As shown in FIG. 7, the width of the command descriptor block is 8 bytes, and its length is 10 bytes. From top to bottom, the row marked "0" can be an operation code. In some implementations, a target device can identify a command as a packet command based on the value of the operation code. The rows marked "1" and "8" can be reserved. The two rows marked "2" and "3" can include a packet tag identifying the packet command. In some implementations, the packet tag is preserved be the target device and used to identify a subsequent packet read or packet write command. For example, the target device can determine whether a stored packet tag from a packet command matches a packet tag included in a subsequent packet read or packet write command. If the packet tags match, then the target device can confirm that the packet read or packet write command corresponds to a particular packet command and consolidated command information. The four rows marked "4", "5", "6", and "7" can represent the packet size in number of bytes (e.g., the size of consolidated command information to follow the packet command). In some implementations, the packet size represented in rows "4", "5", "6", and "7" is the same as the packet size specified in the packet header described in FIG. 8. Finally, the row marked "9" can represent a control (e.g., a SCSI standard control).

Figure 8:
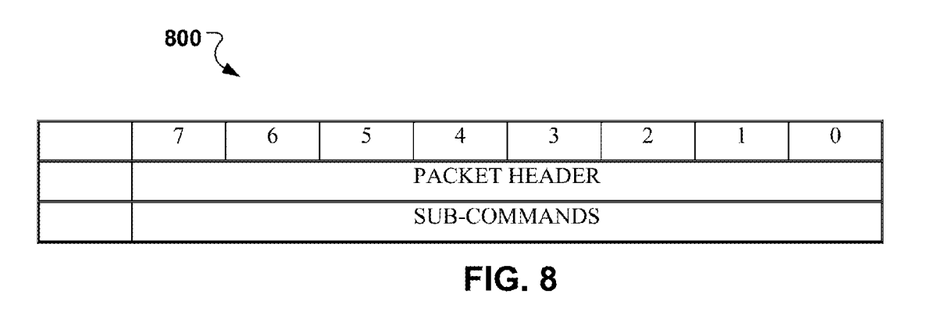
FIG. 8 shows an example of a format for consolidated command information.

FIG. 8 shows an example of a format for consolidated command information 800. As shown in FIG. 8, the width of the packet is 8 bytes, and it includes, from top to bottom, a packet header and sub-commands (e.g., consolidated command information). The packet header and sub-command are described below.

Figure 9:
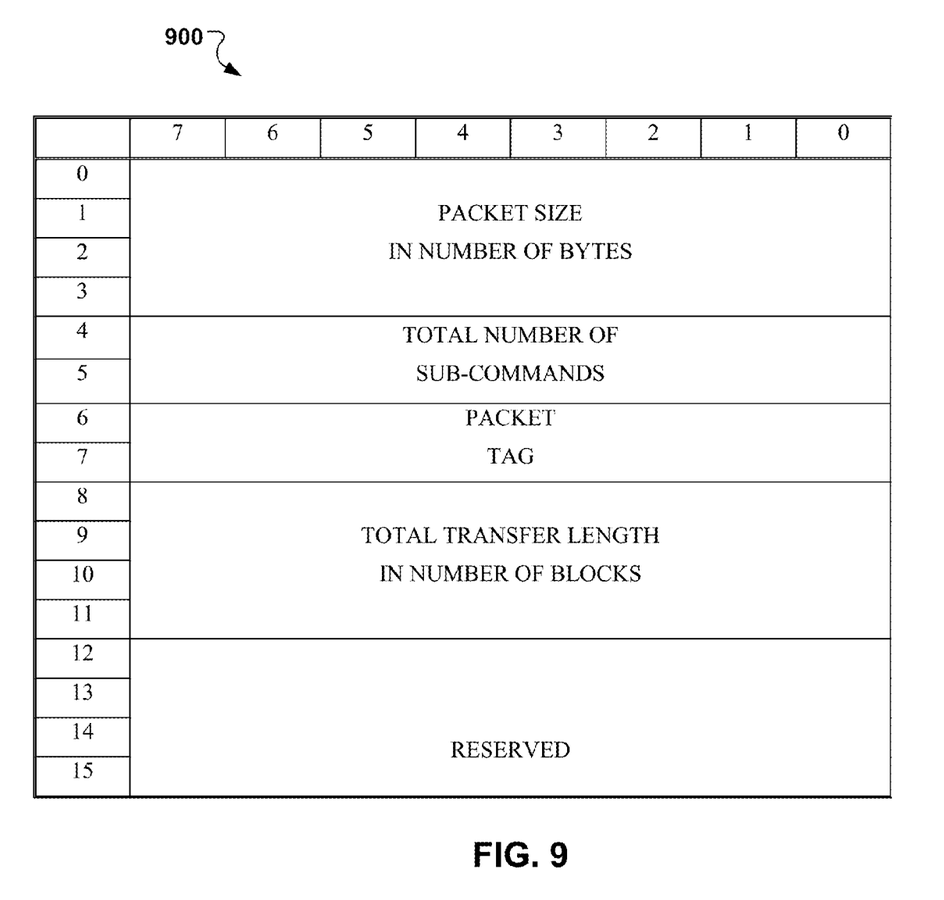
FIG. 9 shows an example of a packet header for consolidated command information.

FIG. 9 shows an example of a packet header 900 for consolidated command information. As shown in FIG. 9, the width of the packet header is 8 bytes, and its length is 16 bytes. From top to bottom, the four rows marked "0", "1", "2", and "3" are packet size in number of bytes, the two rows marked "4" and "5" are total number of sub-commands, the two rows marked "6" and "7" include the same packet tag as the packet command, the four rows marked "8", "9", "10", and "11" are total transfer length in number of blocks, and the four rows marked "12", "13", "14", and "15" are reserved.

Figure 10:
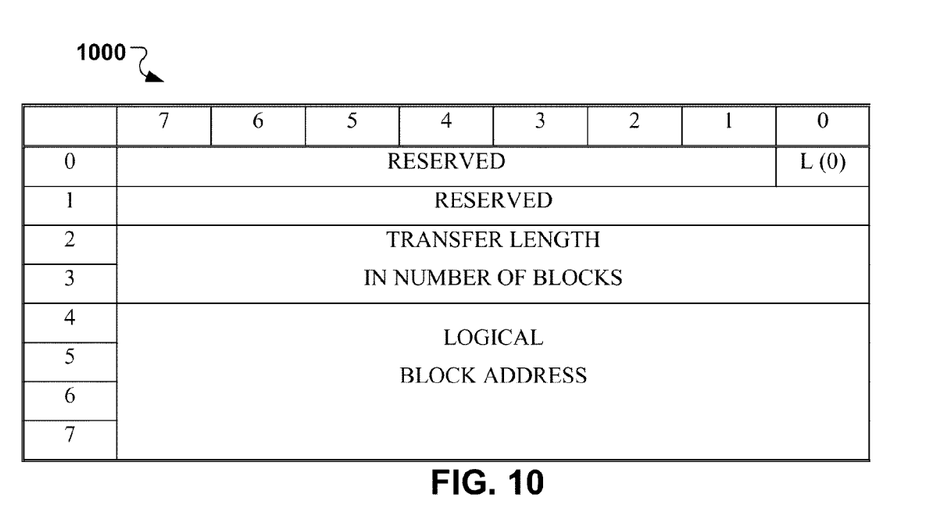
FIG. 10 shows an example of consolidated command information.
Figure 11:
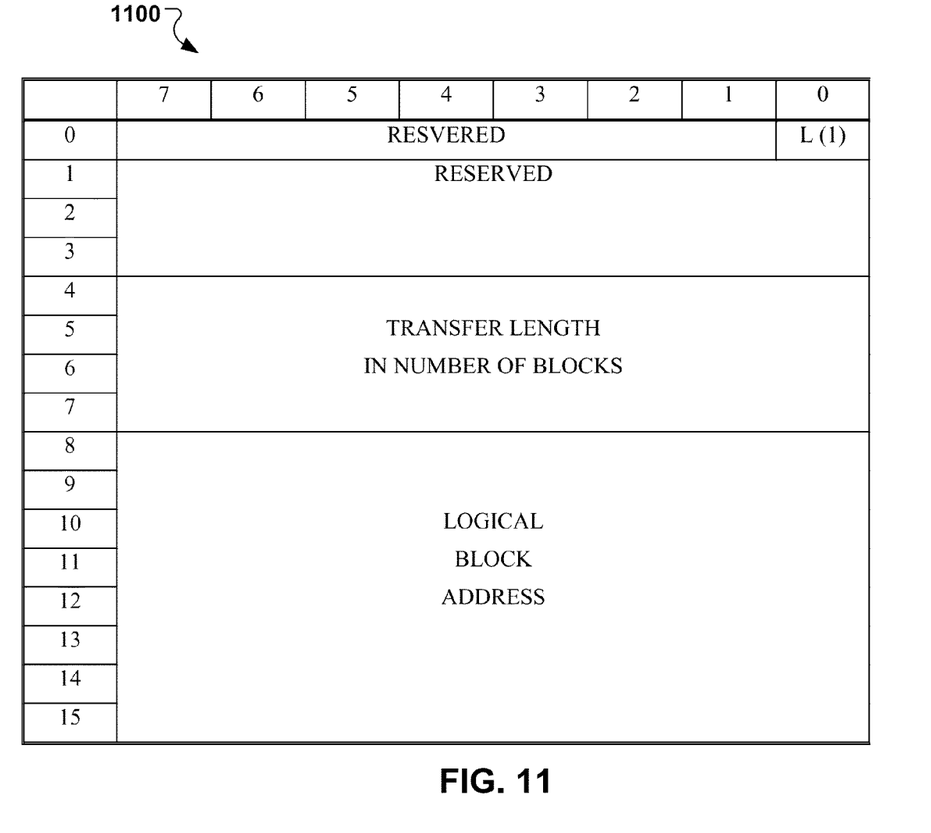
FIG. 11 shows an example of consolidated command information.

FIG. 10 and FIG. 11 show examples of consolidated command information 1000 and 1100. As shown in FIG. 10, the width of the command descriptor block 1000 for an 8-byte sub-command (e.g., consolidated command information) is 8 bytes and its length is also 8 bytes. As shown in FIG. 11, the width of the command descriptor block 1100 for a 16-byte sub-command (e.g., consolidated command information) is 8 bytes whereas its length is 16 bytes. In these two sub-command descriptor blocks, the rows marked "0" are reserved. The bytes marked "0" at the far right of these rows indicate that the descriptor block is either for an 8-byte format sub-command or for a 16-byte sub-command. For example, when the content of this byte is L(0) as shown in FIG. 10, the command descriptor block of this byte is an 8-byte sub-command. When the content of this byte is L(1), as shown in FIG. 11, the command descriptor block of this byte is a 16-byte sub-command.

As shown in FIGS. 10 and 11, in the 8-byte format command descriptor block, the row marked "1" is reserved, and in the 16-byte format command descriptor block, the three rows marked "1", "2", and "3" are reserved. In the 8-byte format command descriptor block, the two rows marked "2" and "3" represent the transfer length in number of blocks, and in the 16-byte format command descriptor block, the four rows marked "4", "5", "6", and "7" represent transfer length in number of blocks. In the 8-byte format command descriptor block, the four rows marked "4", "5", "6", and "7" specify logical block addresses (LBA), and in the 16-byte format command descriptor block, the eight rows marked "8", "9", "10", "11", "12", "13", "14", and "15" specify LBAs.

A main difference between the 8-byte format command descriptor block and the 16-byte format command descriptor block is the quantity of information described. In some implementations, whether or not an 8-byte sub-command or a 16-byte sub-command is used is determined by factors such as hardware capabilities and the number of sub-commands to be aggregated. For example, larger capacity storage devices may have lengthy LBAs, thus making use of the 16-byte sub-command more practical than the 8-byte sub-command.

Figure 12:
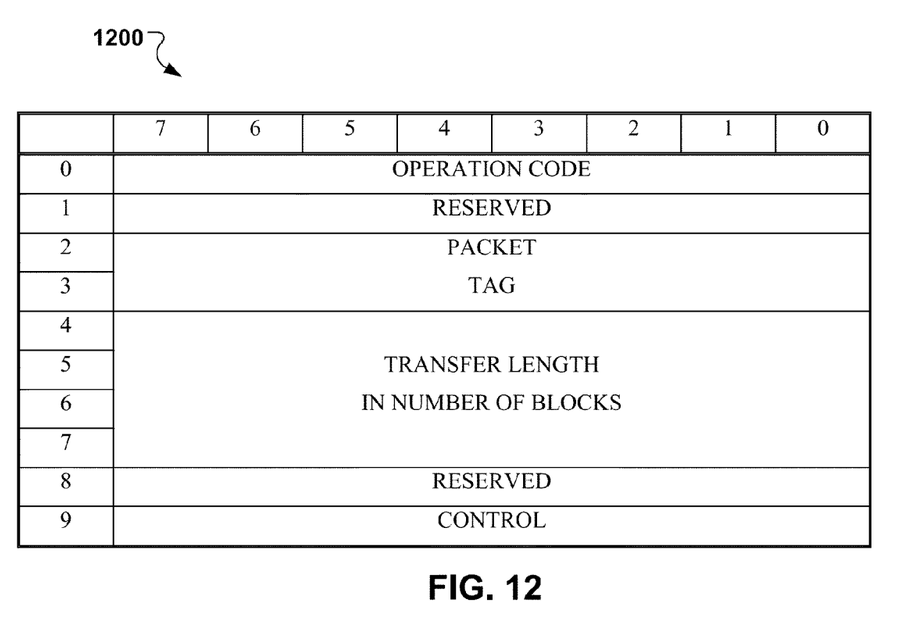
FIG. 12 shows an example of a command descriptor block for a packet read command or packet write command.

FIG. 12 shows an example of a command descriptor block 1200 for a packet read command or packet write command. In some implementations, the format for a packet read command and for a packet write command are the same. For example each command can be 8 bytes wide and 10 bytes long. As shown in FIG. 12, in command descriptor block 1200, from top to bottom, the row marked "0" represents an operation code, the two rows marked "1" and "8" are reserved, the two rows marked "2" and "3" include the same packet tag from the packet command, the four rows marked "4", "5", "6", and "7" represent the transfer length in number of bytes, and the row marked "9" is used for control.

Systems Overview

A few embodiments have been described in detail above, and various modifications are possible. The disclosed subject matter, including functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments. Other embodiments fall within the scope of the following claims.

What is claimed is:

1. A method comprising:
   receiving a first command from a device driver through interface hardware for accessing a storage device;
   identifying the received command as an aggregation command having a tag corresponding to consolidated command information;
   communicating a transfer ready notification to the device driver;
   receiving the consolidated command information from the device driver, wherein the consolidated command information includes memory addresses and data transfer counts for a defined quantity of aggregated input/output (I/O) commands or for aggregated I/O commands that are received within a defined period of time;
   storing the consolidated command information in memory;
   receiving a second command including the tag corresponding to the consolidated command information; and
   processing the second command with respect to the storage device based on the memory addresses and the data transfer counts in the consolidated command information.

2. The method of claim 1, wherein the consolidated command information includes the memory addresses and the data transfer counts for the aggregated I/O commands that are received within the defined period of time, and the defined period of time is specified based on a processing capability of the device driver.

3. The method of claim 1, wherein the consolidated command information includes the memory addresses and the data transfer counts for the aggregated I/O commands that are received within the defined period of time, and the defined period of time is specified based on an I/O processing strength of the storage device.

4. The method of claim 1, wherein the consolidated command information includes the memory addresses and the data transfer counts for the defined quantity of aggregated I/O commands, and the defined quantity is specified based on a processing capability of the device driver.

5. The method of claim 1, wherein the consolidated command information includes the memory addresses and the data transfer counts for the defined quantity of aggregated I/O commands, and the defined quantity is specified based on an I/O processing strength of the storage device.

6. The method of claim 1, wherein the interface hardware uses a small computer system interface (SCSI) standard.

7. The method of claim 6, wherein the storage device comprises a solid state disk (SSD).

8. The method of claim 7, wherein the aggregated I/O commands are all read commands specified in the consolidated command information comprising a consolidated command table including a list of sub-commands having a specified command format.

9. The method of claim 8, wherein processing the second command comprises:
   sending data from the storage device to the device driver in accordance with the memory addresses and the data transfer counts in the consolidated command information; and
   sending a response to the device driver, wherein the response includes a status of the storage device and the data send.

10. The method of claim 7, wherein the aggregated I/O commands are all write commands specified in the consolidated command information comprising a consolidated command table including a list of sub-commands having a specified command format.

11. The method of claim 10, wherein processing the second command comprises:
    sending a transfer ready notification to the device driver;
    receiving data from the device driver;
    storing the received data in the storage device in accordance with the memory addresses and the data transfer counts in the consolidated command information; and
    sending a response to the device driver.

12. A non-transitory computer-readable medium encoding a program operable to cause one or more data processing apparatus to perform operations comprising:
    receiving input/output (I/O) commands comprising read and write commands for two or more target storage devices;
    grouping the received I/O commands, the grouping comprising entering commands in different device groups for different ones of the two or more target storage devices and entering read commands and write commands for respective target storage devices of the two or more target storage devices into respective separate read groups and write groups;
    obtaining I/O command aggregates from the read groups and write groups, wherein each of the I/O command aggregates is an entirely read command aggregate or an entirely write command aggregate for one of the two or more target storage devices; and
    sending the obtained I/O command aggregates to respective ones of the two or more target storage devices;

wherein obtaining the I/O command aggregates from the read groups and write groups comprises generating the I/O command aggregates based on a processing capability of the program on the one or more data processing apparatus and based on an I/O processing strength of the two or more target storage devices.

13. The computer-readable medium of claim 12, wherein generating the I/O command aggregates comprises aggregating a defined quantity of I/O commands.

14. The computer-readable medium of claim 12, wherein generating the I/O command aggregates comprises aggregating I/O commands that are received within a defined period of time.

15. The computer-readable medium of claim 12, wherein sending the obtained I/O command aggregates to respective ones of the two or more target storage devices comprises:
   preparing consolidated command information for an I/O command aggregate for a target storage device;
   sending a first command to the target storage device through small computer system interface (SCSI) hardware, the first command having a tag corresponding to the consolidated command information;
   receiving a transfer ready notification from the target storage device;
   sending the consolidated command information to the target storage device; and
   sending a second command including the tag corresponding to the consolidated command information.

16. The computer-readable medium of claim 15, wherein the target storage device comprises a solid state disk (SSD).

17. The computer-readable medium of claim 16, wherein the consolidated command information comprises a consolidated command table including a list of sub-commands having a specified command format with memory addresses and data transfer counts.

18. The computer-readable medium of claim 17, wherein the sub-commands are all read commands, and sending the obtained I/O command aggregates to respective ones of the two or more target storage devices comprises:
   receiving data from the target storage device in accordance with the memory addresses and the data transfer counts in the consolidated command information; and
   receiving a response from the target storage device, wherein the response includes a status of the target storage device.

19. The computer-readable medium of claim 17, wherein the sub-commands are all write commands, and sending the obtained I/O command aggregates to respective ones of the two or more target storage devices comprises:
   receiving a transfer ready notification from the target storage device;
   sending data to the target storage device, the data corresponding to the memory addresses and the data transfer counts; and
   receiving a response from the target storage device.

* * * * *